United States Patent
Andress

[19]

[11] Patent Number: 6,158,330
[45] Date of Patent: Dec. 12, 2000

[54] BROILER PAN COOKING GRID

[76] Inventor: Alphonso G. Andress, Malecon Balta 720, Lima 18, Peru

[21] Appl. No.: 09/434,379

[22] Filed: Nov. 5, 1999

[51] Int. Cl.$^7$ ........................................... A47J 37/07
[52] U.S. Cl. .................. 99/445; 99/446; 99/400; 99/450
[58] Field of Search ................ 99/445, 446, 400, 99/444, 450

[56] References Cited

U.S. PATENT DOCUMENTS

| | | | |
|---|---|---|---|
| 2,940,381 | 6/1960 | Cottongim et al. | 99/445 |
| 3,422,746 | 1/1969 | Sheinker | 99/445 |
| 3,443,510 | 5/1969 | Norton | 99/445 |
| 4,608,917 | 9/1986 | Faaborg | 99/445 X |
| 5,237,914 | 8/1993 | Carstensen | 99/445 |
| 5,259,299 | 11/1993 | Ferraro | 99/445 X |
| 5,839,361 | 11/1998 | Richter | 99/445 X |

FOREIGN PATENT DOCUMENTS

| | | | |
|---|---|---|---|
| 129109 | 9/1948 | Australia | 99/445 |

*Primary Examiner*—Reginald L. Alexander
*Attorney, Agent, or Firm*—Kile McIntyre Harbin & Lee

[57] ABSTRACT

A broiler pan cooking grid for a barbecue grill that catches and/or routes grease drippings, as well as permitting convection of heated air through the structure. The grid may be used with conventional horizontal barbecue grills or with grills having a vertical hearth or firebox. The grid assembly preferably comprises sheet metal having cutouts stamped in the upper surface, e.g., elongated slots or perforations, and a series of elongated troughs stamped in the lower surface. The elongated troughs of the lower layer route grease drippings to a grease box or tray that is disposed along the front edge of the cooking grid assembly. As series of stiffening rods are sandwiched between the layers to provide rigidity when using thin sheet metal. Preferably, the grid assembly is supported in an inclined position by the barbecue grill, but the lower sheet metal stamping may itself be formed to contain the grease or to effect the flow of grease to a grease box.

3 Claims, 4 Drawing Sheets

BROILER PAN COOKING GRID

CROSS-REFERENCE TO RELATED PATENTS AND PATENT APPLICATIONS.

This invention is related to commonly-owned U.S. patent application Ser. No. 09/332,903, entitled Improvements to Vertical Hearth Barbecue Grill, filed Jun. 15, 1999, which is incorporated herein by reference.

BACKGROUND OF THE INVENTION

This invention is related to a cooking grid for barbecue grills, which may be used with barbecue grills having a heating source underneath or laterally of said cooking grid.

One object of the invention is to prevent grease drippings from falling on an open flame and igniting, which, in horizontal barbecue grills, tends to cause burning of meats.

Another object of the invention is to catch grease drippings during barbecuing in order to prevent spoiling of gas burners and/or briquettes, thereby facilitating clean up after barbecuing.

Another object of the invention is to provide routing and/or trapping of cooking effluence during barbecuing.

SUMMARY OF THE INVENTION

In accordance with the invention, a broiler pan cooking grid for use in a barbecue grill comprises an upper supporting layer or structure that supports foodstuffs and permits pass through of liquid effluence therefrom to a lower grease routing structure that includes a series of troughs located substantially beneath cutouts in the upper supporting layer or structure. The upper supporting layer and the lower grease catching structure both include openings and are disposed relative to each other to permit convection of heated air upward through said grease catching support and said upper support. In addition, the grease routing structure may route grease drippings to a grease box disposed along a front edge of the grid. The cutouts and troughs may take on a variety of shapes, e.g., longitudinal slots and troughs, perforations and troughs, etc.

These and other aspects, features, objectives of the invention will become readily apparent upon review of the succeeding description taken in conjunction with the accompanying drawings. The invention, though, is pointed out with particularity by the appended claims.

DESCRIPTION OF ILLUSTRATIVE EMBODIMENT

In a preferred embodiment, the cooking grid assembly comprises sheet metal stampings of mild or stainless steel and may be used with charcoal or gas-burning horizontal or vertical barbecue grills.

Figure 1:
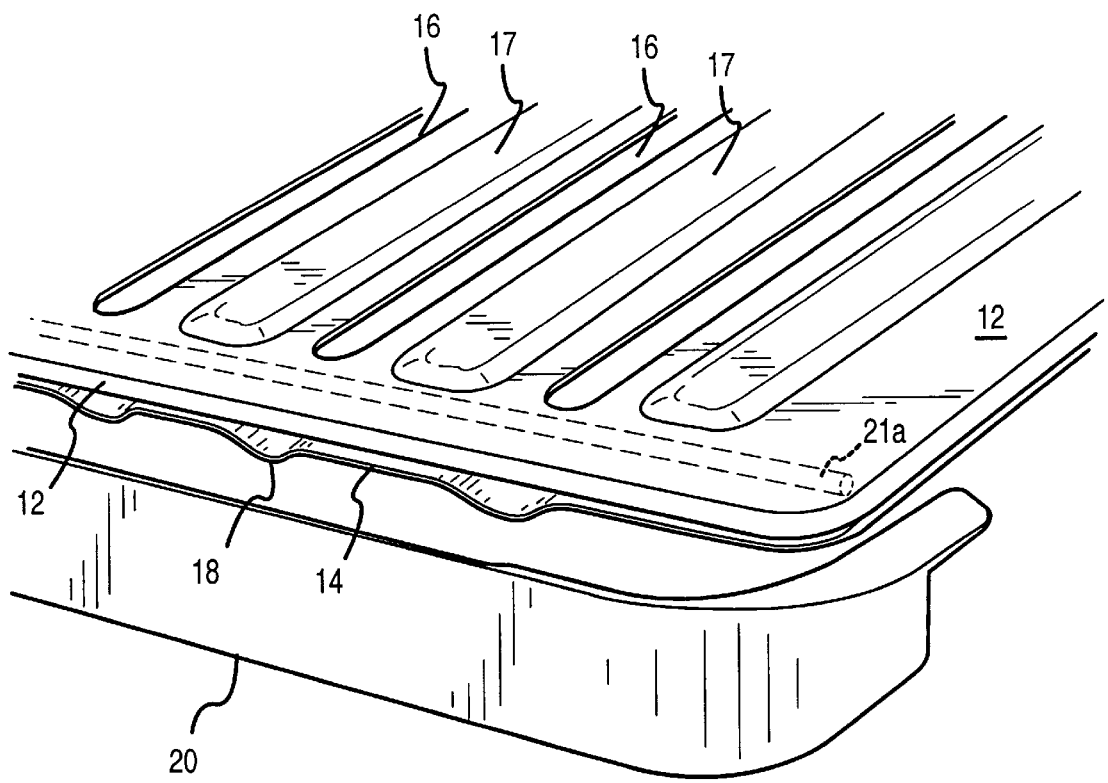
FIG. 1 is a perspective view of an exemplary cooking grid and grease box, which includes the subject matter of the present invention.
Figure 2A:
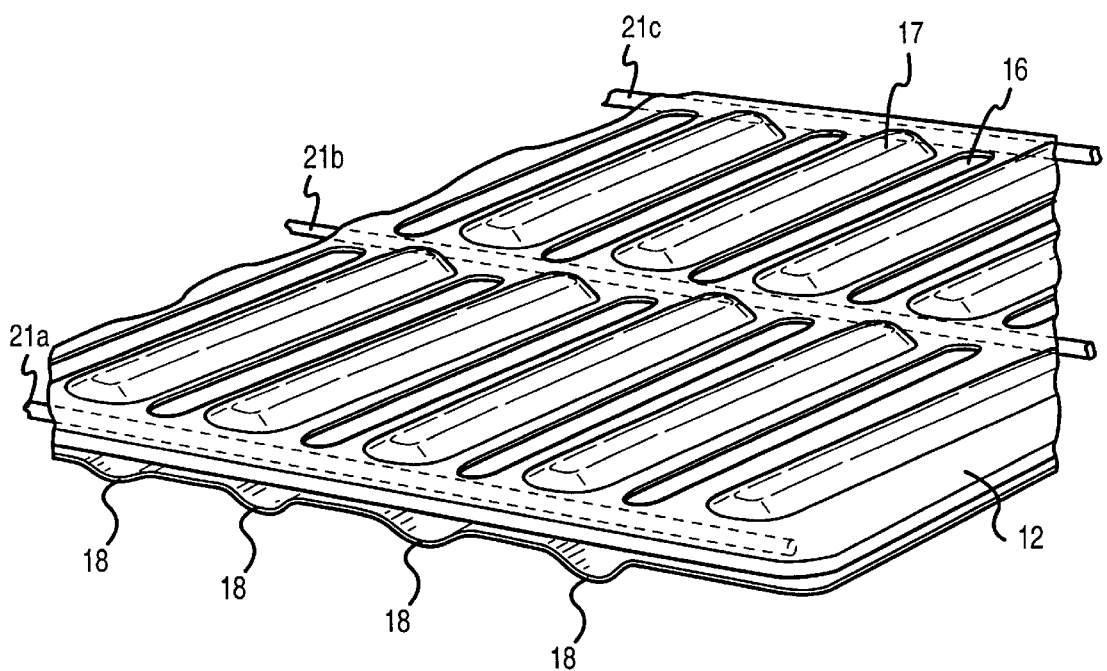
FIGS. 2A and 2B are perspective views of the top of the cooking grid depicted in FIG. 1.
Figure 2B:
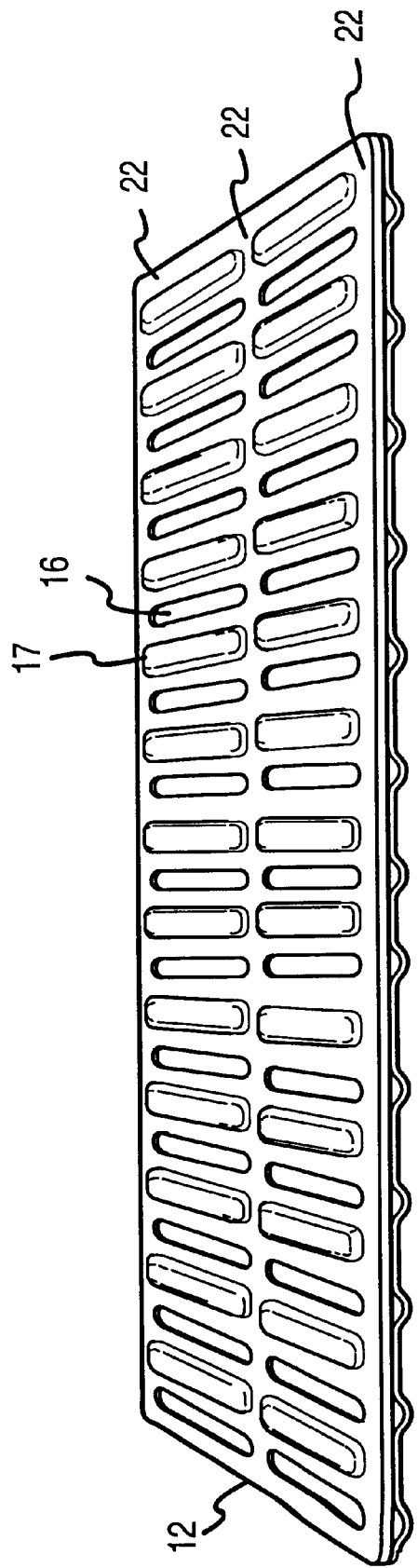
Figure 3:
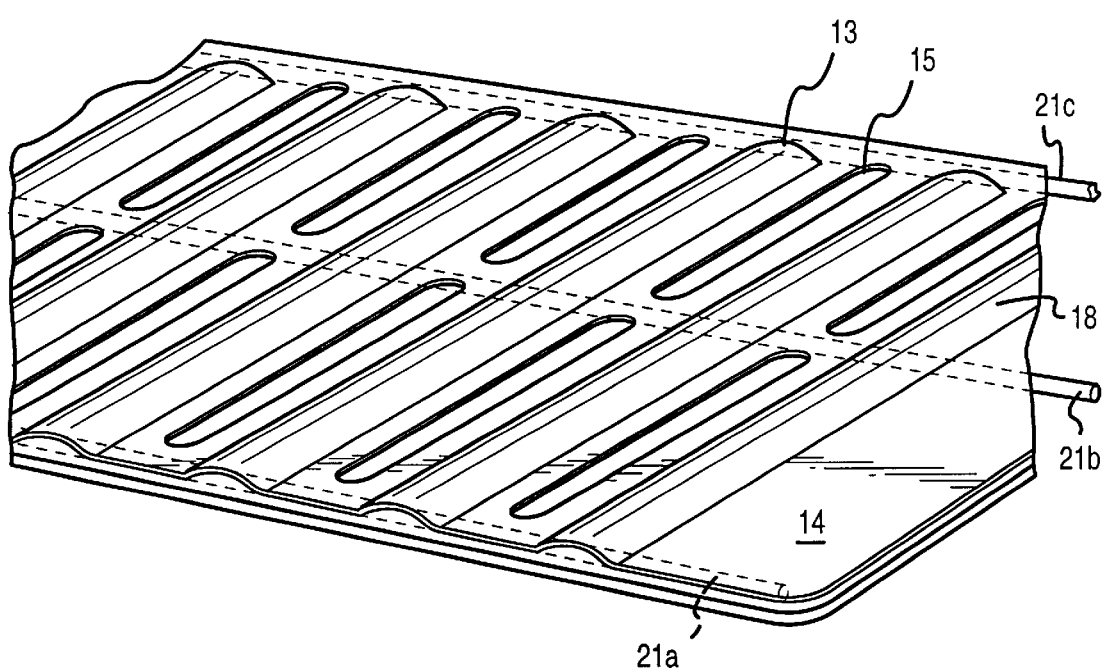
FIG. 3 is a perspective view of the bottom of the cooking grid depicted in FIG. 1.

Referring to FIGS. 1, 2A, 2B, and 3, the assembly comprises a top portion 12 and a bottom portion 14, which are joined together by stiffening rods (not shown) between portions 12 and 14 and extending laterally for side to side at 22 (FIG. 2B). Top layer of sheet metal includes a series of slots or cutouts 16 through which grease drippings fall to the lower layer 14. Mounds 17 are disposed between the slots, which may also lie in troughs. Troughs 13 (FIG. 3) in the lower layer 14 are laterally offset from mounds 17 in the upper layer, which enables reversibility of the cooking grid so that it may be used on either side. As shown in FIG. 1, the top layer 12 includes a folded over lip in the front thereof, but this may be removed so that the top and bottom layers 12, 14 are substantially the same.

Lower layer 14 includes a series of longitudinally extending troughs 18 disposed beneath the slots 16 of the upper layer. The troughs 18 catch drippings and route them to a grease box 20 (FIG. 1) disposed along the front edge of the grid assembly due to being supported in an inclined position in a barbecue grill, as shown in related patent application Ser. No. 09/332,903, incorporated herein. Grease box 20 may include a number of baffles or upward protrusions (not shown) in the bottom surface to break the flow of grease to reduce the chance of spillage when carrying the grease box for dumping.

Sheet metal stampings 12 and 14 may be porcelain dipped to form a non-stick surface in order to facilitate cleaning. Alternatively, the upper and lower portions 12 and 14 may comprise oppositely facing and laterally offsetting troughs, e.g., a number of parallel small channels or angles, as shown in the related incorporated patent application mentioned above. In the preferred embodiment, the upper and lower portions are disposed relative to each other so that troughs in the lower portion or layer catch vertically falling grease drippings while intervening spaces, perforations, cutouts or slots in the upper and lower portion permit convection of heated air from beneath the cooking grid assembly. See, for example, cutouts 15 (FIG. 3) of the bottom layer 14.

To reduce cost and weight of the assembly, the preferred assembly uses thin sheet metal, e.g., eighteen to twenty gage sheet metal, and a number stiffening rods, e.g., 3/16" diameter, inserted between and traversing the upper and lower layers at positions 22 (FIG. 2B).

As evident to those skilled in the art, numerous modifications, substitutes, and alternatives will become apparent based on the teachings herein. Accordingly, it is my intent to embrace such alternatives by the appended claims.

I claim:

1. A cooking grid for use in a barbecue grill, said grid comprising:

an upper layer of sheet metal including a plurality of raised mounds and a plurality of cutouts being disposed lower than said mounds to permit pass through of liquids to a lower layer of sheet metal, said lower layer of sheet metal including a series of troughs disposed beneath said cutouts of said upper layer of sheet metal, a plurality of stiffening rods interposed between and attached to said upper and lower layers of sheet metal thereby to form a substantially thin and rigid interconnected assembly, said cutouts in said upper layer of sheet metal including at least first and second rows of longitudinal slots with interconnecting webs between respective slots wherein said stiffening rods between said upper and lower layers lie underneath a front edge, a rear edge, and said webs whereby to shield said stiffening rods from external view, and said upper and lower layers of sheet metal being disposed relative to each other to permit convection of air generally upward through openings in said lower layer and said cutouts in said upper layer while at the same time catching and channeling liquid runoffs from said upper layer into said troughs of said lower layer.

2. The cooking grid as recited in claim 1, wherein said upper layer comprises a series of substantially parallel longitudinal cutouts and said lower layer comprises a corresponding series of substantially parallel longitudinal troughs extending beneath said cutouts whereby to catch grease drippings from foodstuff that is heated while disposed above said upper layer.

3. The broiler pan cooking grid as recited in claim 1, wherein said upper and lower layers are porcelain dipped.

* * * * *